US006137337A

United States Patent [19]

Beom

[11] Patent Number: 6,137,337

[45] Date of Patent: Oct. 24, 2000

[54] SAMPLING CLOCK SIGNAL GENERATION CIRCUIT OF LIQUID CRYSTAL DISPLAY DEVICE

[75] Inventor: Yeo Jeong Beom, Seoul, Rep. of Korea

[73] Assignee: Hyundai Electronics Industries Co., Ltd., Kyoungki-do, Rep. of Korea

[21] Appl. No.: 09/107,694

[22] Filed: Jun. 30, 1998

[30] Foreign Application Priority Data

Jun. 30, 1997 [KR] Rep. of Korea ...................... 97-30422

[51] Int. Cl.[7] ........................................................ G06F 1/04

[52] U.S. Cl. .......................... 327/296; 327/115; 327/145; 365/233.5

[58] Field of Search ............................ 327/141, 142–145, 327/115, 113, 114, 117, 120, 107, 166, 291–293, 295, 296; 377/47, 48; 375/362, 354; 365/233, 233.5; 326/93–96

[56] References Cited

U.S. PATENT DOCUMENTS 5,111,151 5/1992 Li ............................................ 327/159
5,157,341 10/1992 Fobbester et al. .......................... 327/7
5,789,953 8/1998 Au et al. ................................ 327/116

FOREIGN PATENT DOCUMENTS 1-157618 6/1989 Japan .
2-76416 3/1990 Japan .

*Primary Examiner*—Timothy P. Callahan
*Assistant Examiner*—Minh Nguyen
*Attorney, Agent, or Firm*—Selitto & Associates

[57] ABSTRACT

A sampling clock signal generation circuit of a liquid crystal display device, includes a synchronousness compensation section receiving the reference synchronous signal and a master clock signal as input signals, to generate a synchronousness compensation signal, and a sampling clock signal generation section being initialized by the synchronousness compensation signal and dividing the master clock signal, to generate sampling clock signals synchronized with the reference synchronous signal.

7 Claims, 4 Drawing Sheets

SAMPLING CLOCK SIGNAL GENERATION CIRCUIT OF LIQUID CRYSTAL DISPLAY DEVICE

BACKGROUND OF THE INVENTION

Field of the Invention

The present invention generally relates to a sampling clock signal generation circuit of a liquid crystal display device, and more particularly to a sampling clock signal generation circuit for sampling RGB data in a liquid crystal device.

DESCRIPTION OF THE RELATED ART

FIG. 1 is a block diagram of a conventional sampling clock signal generation circuit of a liquid crystal display device. FIG. 2 is a block diagram of a phase locked loop("PLL") circuit 10 in FIG. 1.

Referring to FIG. 1, a PLL circuit 10 receives an external reference synchronous signal Csync to generate a master clock signal MCLK. A sampling clock signal generation circuit 20 receives the master clock signal MCLK to generate a sampling clock signal CPH for sampling RGB data. Referring to FIG. 2, in the PLL circuit 10, a phase comparator 11 generates a phase difference detection signal PDS by comparing phase difference between the reference synchronous signal Csync and a comparison signal. A low pass filter("LPF") 12 integrates the phase difference detection signal PDS. A voltage control oscillator("VCO") 13 generates the master clock signal MCLK synchronized with the reference synchronous signal Csync by transforming a frequency with the integrated phase difference detection signal PDS as a voltage control signal. A divider 14 divides the master clock signal MCLK supplied from the VCO 13 by 1/N. A synchronous signal generator 15 generates an internal synchronous signal in response to the divided master clock signal MCLK and supplies it for the phase comparator 11 as the comparison signal.

In the above sampling clock signal generation circuit of the liquid crystal display device, in case the master clock signal MCLK is synchronized with the sampling clock signal CPH, a display is stable. However, although the master clock signal MCLK is synchronized with the reference synchronous signal Csync, there is a case that the sampling clock signal CPH is not synchronized with the reference synchronous signal. More particularly, since the frequency is extremely varied when the phase comparator 11 compares the phase difference between the reference synchronous signal Csync and the comparison signal, the phases of the master clock signal MCLK and the reference synchronous signal Csync are momently changed.

Thus, in case the sampling clock signal CPH is not synchronized with the reference synchronous signal Csync and has a selected delay time, display is unstable. As a result, display characteristics of the liquid crystal display device deteriorate.

SUMMARY OF THE INVENTION

It is therefore an object of the present invention to provide a sampling clock signal generation circuit of a liquid crystal display device which can improve the display characteristics thereof by synchronizing a sampling clock signal with an external reference synchronous signal regardless of the variation of a master clock signal, for solving the problems in the conventional art.

To accomplish this above object, a sampling clock signal generation circuit of a liquid crystal display device, includes a synchronousness compensation section receiving the reference synchronous signal and the master clock signal as input signals, to generate a synchronousness compensation signal, and a sampling clock signal generation section being initialized by the synchronousness compensation signal and dividing the master clock signal, to generate sampling clock signals synchronized with the reference synchronous signal.

Furthermore, the synchronousness compensation section includes: a first flip-flop detecting the reference synchronous signal at rising edge of the master clock signal; a second flip-flop detecting the reference synchronous signal at falling edge of the master clock signal; and an AND gate receiving output signals of the first and second flip-flops to generate the synchronousness compensation signal.

Moreover, the sampling clock signal generation section comprises: a first sampling clock signal generation section being initialized by the synchronousness compensation signal and generating a first pulse signal at falling edge of the master clock signal; a second sampling clock signal generation section being initialized by the synchronousness compensation signal and generating a second pulse signal at rising edge of the master clock signal; an output section receiving the first and second pulse signals to generate a sampling clock signal synchronized with the reference synchronous signal; and an output control section controlling the output of the second sampling clock signal generation section so that the second sampling clock signal generation section generates the second pulse signal after the first sampling clock signal generation section generates the first pulse signal.

Additional object, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Hereinafter, a preferred embodiment of the present invention will be explained in more detail with reference to accompanying drawings.

Figure 3:
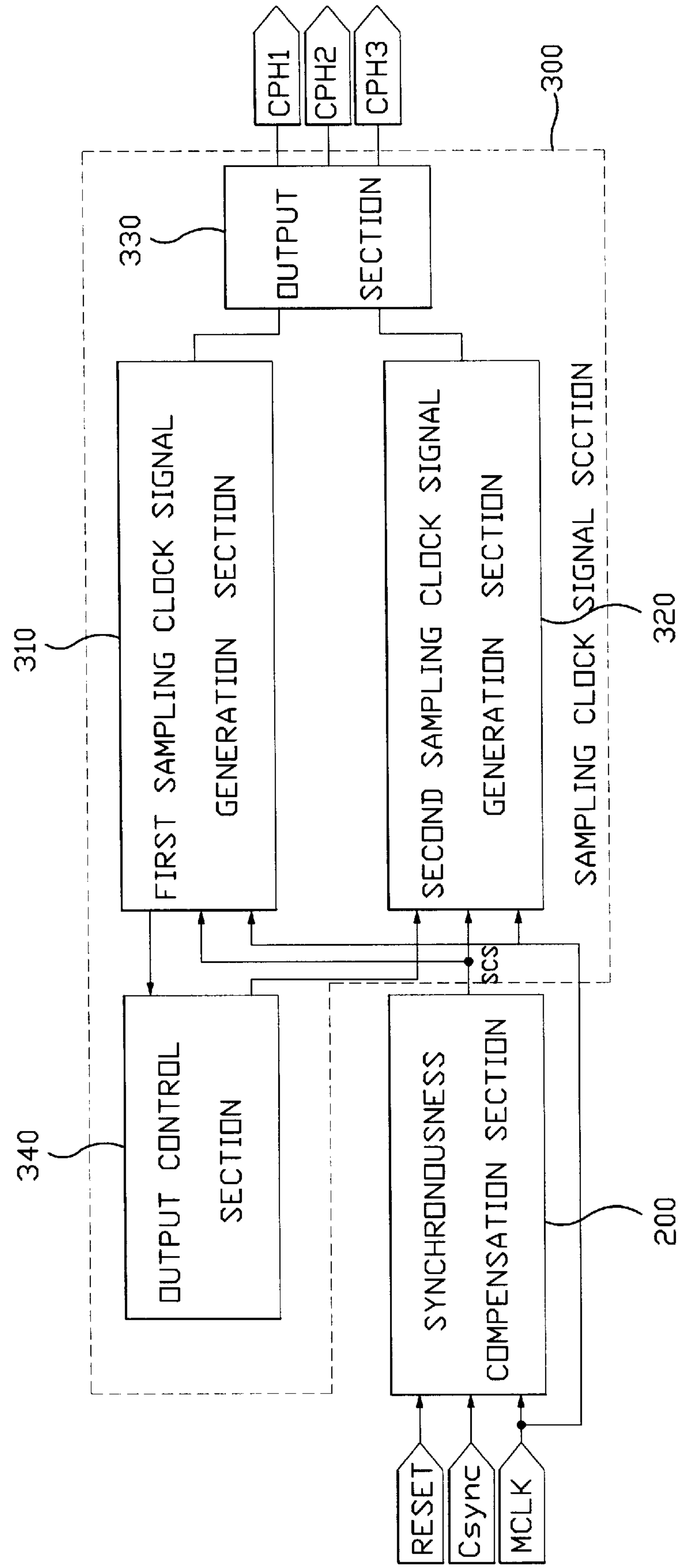
FIG. 3 is a block diagram of a sampling clock signal generation circuit of a liquid crystal display device according to an embodiment of the present invention.
Figure 4:
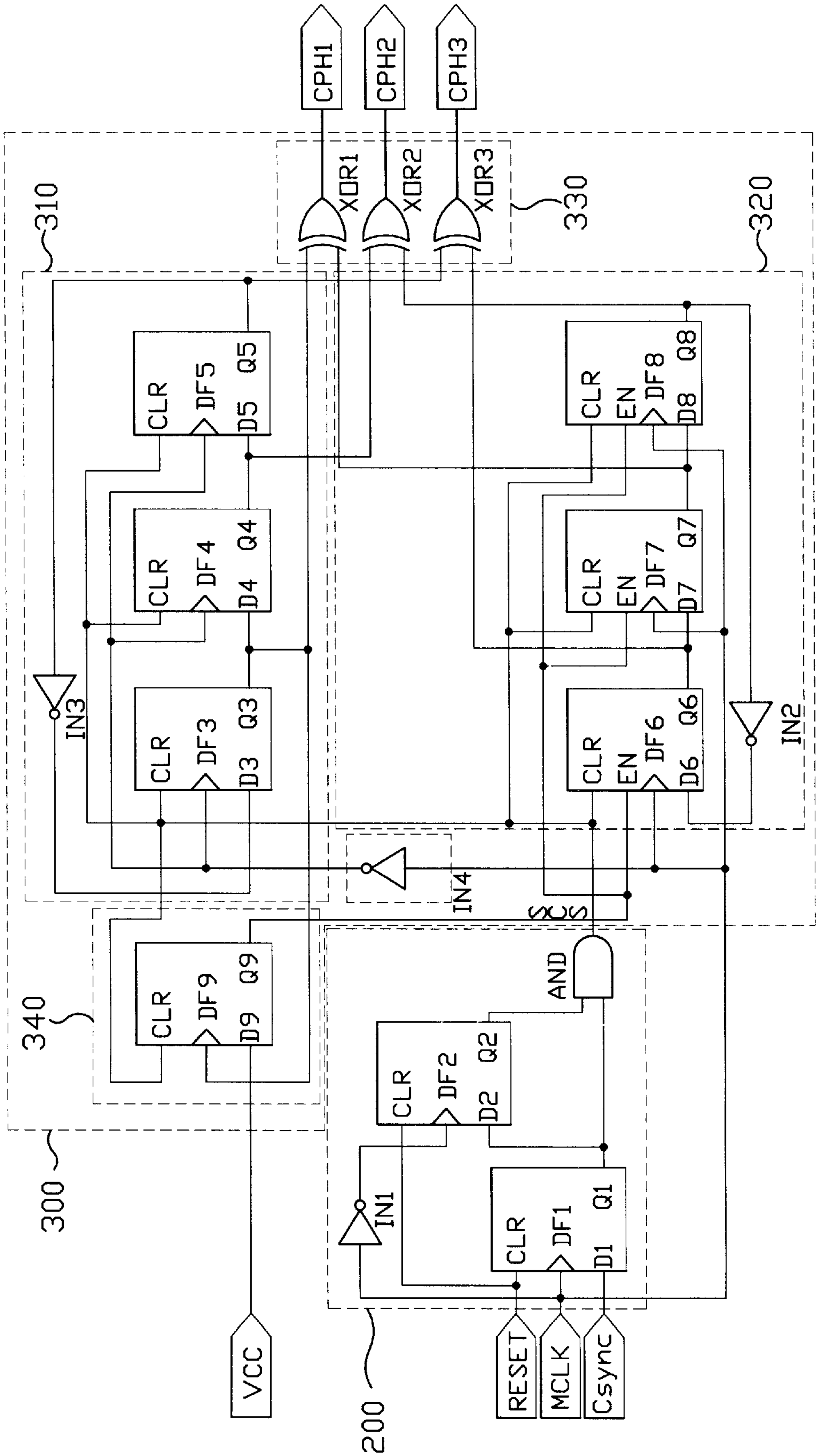
FIG. 4 shows a detail circuit of FIG. 3.

FIG. 3 is a block diagram of a sampling clock signal generation circuit of a liquid crystal display device according to an embodiment of the present invention, and FIG. 4 shows a detail circuit of FIG. 3.

Figure 1:
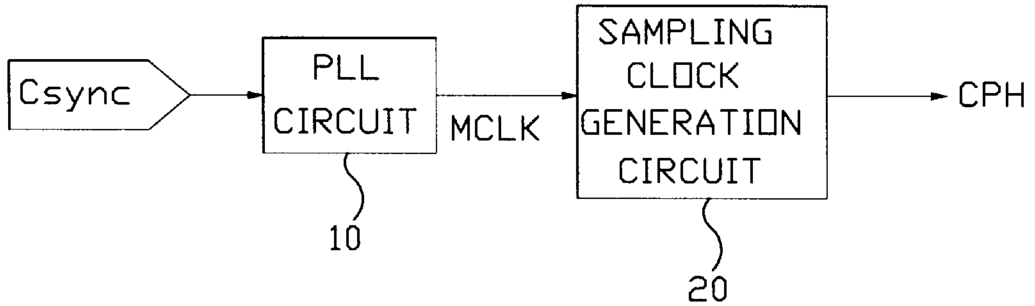
FIG. 1 (PRIOR ART)
FIG. 1 is a block diagram of a conventional sampling clock signal generation circuit of a liquid crystal display device.
Figure 2:
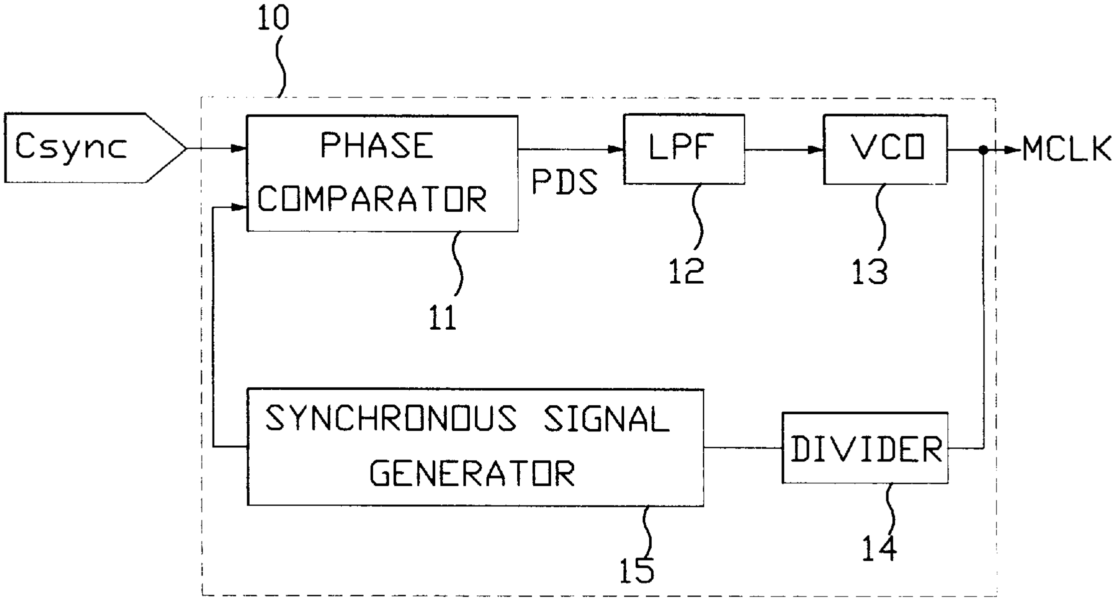
FIG. 2 (PRIOR ART)
FIG. 2 is a block diagram of a PLL circuit in FIG. 2.

Referring to FIG. 3, a sampling clock signal generation circuit of the present invention includes a synchronousness compensation section 200 and a sampling clock signal generation section 300. The synchronousness compensation section 200 generates a synchronousness compensation signal SCS by comparing a master clock signal MCLK supplied from the PLL circuit(refer to FIG. 1) with an external reference synchronous signal Csync. The sampling clock signal generation section 300 is initialized by the synchronousness compensation signal SCS and divides the master clock signal MCLK, to generate first, second and third sampling clock signals CPH1, CPH2 and CPH3 for sampling RGB data.

Referring to FIG. 4, the synchronounsess compensation section 200 has first and second D flip-flops DF1 and DF2, and an AND gate AND. The first and second D flip-flops DF1 and DF2 are initialized by a reset signal RESET. The first D flip-flop DF1 receives the reference synchronous signal Csync as an input signal D1 and the master clock signal MCLK as a clock signal, to detect the reference synchronous signal Csync at rising edge of the master clock signal MCLK. The second D flip-flop DF2 detects an output Q1 of the first D flip flop DF1 at falling edge of the master clock signal MCLK. The AND gate AND receives the output signals Q1 and Q2 of the first and second D flip-flop DF1 and DF2, to generate the synchronousness compensation signal SCS.

Referring to FIG. 3, the sampling clock signal generation section 300 includes first and second sampling clock signal generation sections 310 and 320, an output section 330, and an output control section 340. The first and second sampling clock signal generation sections 310 and 320 are initialized by the synchrousness compensation signal SCS. The first sampling clock signal generation section 310 generates a first pulse signal at falling edge of the master clock signal MCLK. The second sampling clock signal generation section 320 generates a second pulse signal at rising edge of the master clock signal MCLK by the control signal supplied from the output control section 340. The output section 330 receives the first and second pulse signals, to output first, second and third sampling clock signals CPH1, CPH2, and CPH3 synchronized with the reference synchronous signal Csync. The output control section 340 generates the control signal so that the second sampling clock signal generation section 320 generates the second pulse signal after the first sampling clock signal generation section 310 generates the first pulse signal.

Referring to FIG. 4, the first sampling clock signal generation section 310 has third, fourth and fifth D flip-flop DF3, DF4 and DF5 initialized by the synchronousness compensation signal SCS, respectively, and receiving the master clock signal MCLK inverted by an inverter INV4 as clock signal, respectively. Each of them receives previous output signals Q5, Q3 and Q4 as input signals D3, D4 and D5, to sequentially generate three pulse signals dividing the master clock signal MCLK into three. Here, the third D flip-flop DF3 receives the output signal Q5 of the fifth D flip-flop DF5 inverted by an inverter INV3 as the input signal D3.

The second sampling clock signal generation section 320 has sixth, seventh and eighth D flip-flop DF6, DF7 and DF8. Each of them is initialized by the synchronousness compensation signal SCS and enabled by the control signal generated from the output control section 340, and receives the master clock signal MCLK as clock signal. Each the sixth, seventh and eight D flip-flop DF6, DF7 and DF8 receives previous output signals Q8, Q6 and Q7 as input signals D6, D7 and D8, to sequentially generate three pulse signals dividing the master clock signal MCLK into three. Here, the sixth D flip-flop DF6 receives the output signal Q8 of the eighth D flip-flop DF8 inverted by an inverter INV3 as the input signal D6.

The output section 330 has first, second and third exclusive OR gate XOR1, XOR2 and XOR3. Each of them receives the first and second pulse signals as two input signals and generates first, second and third sampling clock signals CPH1, CPH2 and CPH3 synchronized with the reference synchronous signal Csync, respectively. More specifically, the first exclusive OR gate XOR1 receives the output signals Q3 and Q7 of the third and seventh D flip-flop DF3 and DF7 as two input signals, to generate the first sampling clock signal CPH1. The second exclusive OR gate XOR2 receives the output signals Q4 and Q8 of the fourth and eighth D flip-flop DF4 and DF8 as two input signals, to generates the second sampling clock signal CPH2. The third exclusive OR gate XOR3 receives the output signals Q5 and Q6 of the fifth and sixth D flip-flop DF5 and DF6 as two input signals, to generates the third sampling clock signal CPH3.

The output control section 340 has a ninth D flip-flop DF9 initialized by the synchronousness compensation signal SCS, receiving VCC as an input signal D9 and the output signal Q3 of the third D flip-flop DF3 as clock signal, to generate the control signal to enable the second sampling clock signal generation section 320. Therefore, the second sampling clock signal generation section 320 generates the second pulse signal after the first sampling clock signal generation section 310 generates the first pulse signal.

Operation of the above sampling clock signal generation circuit will be explained with reference to FIG. 5A through FIG. 5E.

Figures 5A, 5B, 5C, 5D, 5E:
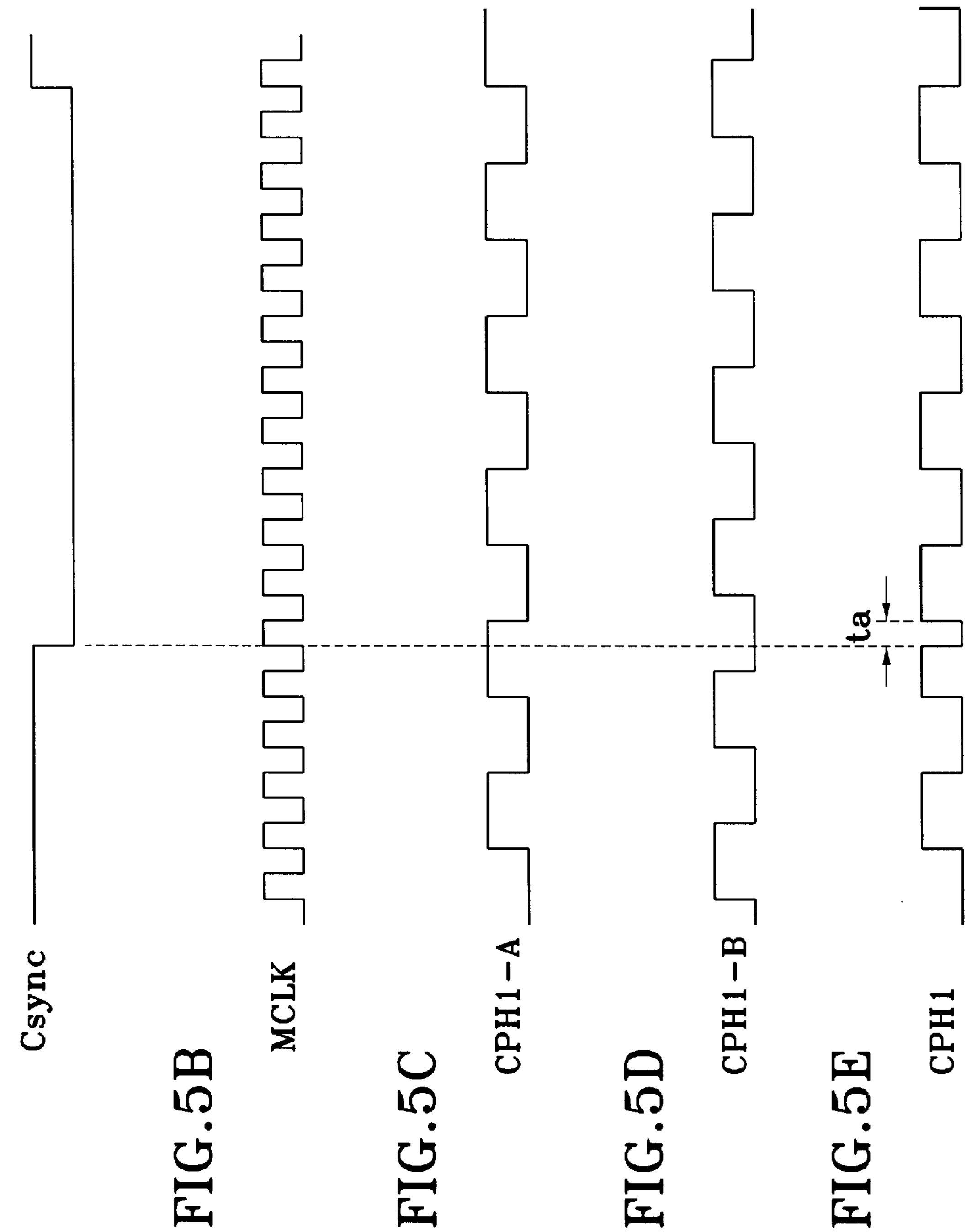
FIG. 5A through FIG. 5E are driving waveforms of a sampling clock signal generation circuit of a liquid crystal display device according to an embodiment of the present invention.

The synchronousness compensation section 200 is initialized by the reset signal RESET and receives the reference synchronous signal Csync shown in FIG. 5A as the input signal D1. It detects low level of the reference synchronous signal Csync at rising edge of the master clock signal MCLK, and generates the synchronousness compensation signal SCS through the AND gate AND.

In the sampling clock signal generation section 300, the third through ninth D flip-flop DF3–DF9 of the first and second sampling clock signal generation sections 310 and 320 are initialized by the synchronousness compensation signal SCS. The third, fourth and fifth D flip-flop DF3, DF4 and DF5 of the first sampling clock signal generation section 310 generate the pulse signal dividing the master clock signal MCLK into three, respectively, at falling edge of the master clock signal MCLK. Furthermore, since the third D flip-flop DF3 receives the output signal Q5 of the fifth D flip-flop DF5 inverted by the inverter INV3 as the input signal D3, the first sampling clock signal generation section 310 generates the three pulse signals dividing the master clock signal MCLK into three, sequentially.

The ninth D flip-flop DF9 of the output control section 340 receives the output signal Q3 of the third D flip-flop DF3 as the clock signal to generate a control signal. The sixth, seventh and eighth D flip-flop DF6, DF7 and DF8 of the sampling clock signal generation section 320 are enabled by the control signal. Therefore, the second sampling clock signal generation section 320 generates the three pulse signals dividing the master clock signal MCLK into three, sequentially, after the first sampling clock signal generation section 310 generates primary pulse signal. The output section 330 receives the pulse signals from the first and second sampling clock signal generation sections 310 and 320 as two input signals, to carry out exclusive logic operation, thereby generating first, second and third sampling clock signals CPH1, CPH2 and CPH3.

As above described, the sampling clock signal generation section 300 is initialized by the synchronousness compensation signal SCS, to generate the sampling clock signal CPH1, CPH2 and CPH3 synchronized with the reference synchronous signal Csync. Therefore, for example although first sampling clock signals CPH1-A and CPH1-B are synchronized with the reference synchronous signal Csync and has a selected delay time as shown in FIG. 5C and FIG. 5D, a first sampling clock signal CPH1 synchronized with the reference synchronous signal Csync is generated as shown in FIG. 5E, because the sampling clock signal generation section 300 is initialized by the synchronousness compensation signal SCS at falling edge of the reference synchronous signal Csync. In FIG. 5E, time ta can be ignored, since the master clock signal MCLK is much shorter in period than low level in 1H of the reference synchronous signal Csync.

According to the present invention, in the sampling clock signal generation circuit of the liquid crystal display device, since the sampling clock signal is synchronized with the reference synchronous signal every 1H, it is possible to sample data exactly, regardless of variation of the master clock signal. As a result, the display characteristics of the liquid crystal display device are improved.

Although the preferred embodiment of this invention has been disclosed for illustrative purpose, those skilled in the art will appreciate that various modifications, additions and substitutions are possible, without from the scope and spirit of the invention as described in the accompanying claims.

What is claimed is:

1. A sampling clock signal generation circuit of a liquid crystal display device generating sampling clock signals with a master clock signal generated from an external reference synchronous signal, comprising:

a synchronousness compensation section receiving the external reference synchronous signal and the master clock signal as input signals, to generate a synchronousness compensation signal; and a sampling clock signal generation section being initialized by the synchronousness compensation signal and dividing the master clock signal, to generate the sampling clock signals synchronized with the external reference synchronous signal, wherein the sampling clock signal generation section includes:

a first sampling clock signal generation section being initialized by the synchronousness compensation signal and generating a first pulse signal at a falling edge of the master clock signal;

a second sampling clock signal generation section being initialized by the synchronousness compensation signal and generating a second pulse signal at a rising edge of the master clock signal;

an output section receiving the first and second pulse signals to generate the sampling clock signals synchronized with the external reference synchronous signal; and an output control section controlling the output of the second sampling clock signal generation section so that the second sampling clock signal generation section generates the second pulse signal after the first sampling clock signal generation section generates the first pulse signal.

2. The sampling clock signal generation circuit according to claim 1, wherein the first sampling clock signal generation section has a plurality of flip-flops, each of the flip-flops being initialized by the synchronousness compensation signal and sequentially generating pulse signals dividing the master clock signal into three at falling edge of the master clock signal.

3. The sampling clock signal generation circuit according to claim 2, wherein each of the flip-flops receives an output signal of a previous flip-flop as an input signal and a primary flip-flop receives an output signal of a final flip-flop as its input signal.

4. The sampling clock signal generation circuit according to claim 1, wherein the second sampling clock signal generation section has a plurality of flip-flops, each of the flip-flops being initialized by the synchronousness compensation signal and sequentially generating pulse signals dividing the master clock signal into three at rising edge of the master clock signal.

5. The sampling clock signal generation circuit according to claim 4, wherein each of the flip-flops receives an output signal of a previous flip-flop as an input signal and a primary flip-flop receives an output signal of a final flip-flop as its input signal.

6. The sampling clock signal generation circuit according to claim 1, wherein the output section comprises a plurality of exclusive OR gates, each of the exclusive OR gates receiving the first and second pulse signals generated from the first and second sampling clock signal generation sections to generate the sampling clock signals synchronized with the external reference synchronous signal.

7. The sampling clock signal generation circuit according to claim 1, wherein the output control section has a flip-flop, the flip-flop being initialized by the synchronousness compensation signal and receiving a primary pulse signal from the first sampling clock signal generation section as a clock signal and VCC as an input signal, to generate a control signal to the second sampling clock signal generation section.

* * * * *